(12) United States Patent
Fitzjarrell et al.

(10) Patent No.: US 7,247,336 B1
(45) Date of Patent: Jul. 24, 2007

(54) NUTRITION BAR WITH AMINO ACID SUPPLEMENT

(75) Inventors: Edwin Fitzjarrell, Sisters, OR (US); David Heron, Bend, OR (US)

(73) Assignee: Metabolic Maintenance Products, Inc., Sisters, OR (US)

( * ) Notice: Subject to any disclaimer, the term of this patent is extended or adjusted under 35 U.S.C. 154(b) by 455 days.

(21) Appl. No.: 10/936,029

(22) Filed: Sep. 7, 2004

(51) Int. Cl.
*A23L 1/304* (2006.01)
(52) U.S. Cl. .......................... 426/656; 426/72; 426/74; 426/102; 426/103; 426/615
(58) Field of Classification Search ............... 426/615, 426/102, 103, 72, 74, 618, 656
See application file for complete search history.

(56) References Cited

U.S. PATENT DOCUMENTS

| 4,055,669 | A | * | 10/1977 | Kelly et al. .................... 426/93 |
| 5,612,074 | A | * | 3/1997 | Leach .......................... 426/74 |
| 6,440,449 | B1 | * | 8/2002 | Hirschberg ................. 424/439 |
| 2005/0113287 | A1 | * | 5/2005 | Nelson .......................... 514/2 |

* cited by examiner

*Primary Examiner*—Helen Pratt
(74) *Attorney, Agent, or Firm*—Hancock Hughey LLP

(57) ABSTRACT

A fruit-based nutrition bar includes free form amino acids added to the bar as supplements. The nutrition bar may include any number of added ingredients and selected amino acids are incorporated in specific functional amounts and proportions.

13 Claims, No Drawings

NUTRITION BAR WITH AMINO ACID SUPPLEMENT

FIELD OF THE INVENTION

This invention relates to a nutrition bar and more particularly to a nutrition bar that incorporates an amino acid supplement formulation.

BACKGROUND AND SUMMARY OF THE INVENTION

There are many types of nutrition bars and other "snack" bars available on the market, and many consumers use such products as a convenient food source. For example, grain based bars such as granola bars are easy to carry and provide a healthy, good tasting food that is consumed by active people such as hikers and athletes, and by everybody else. Because grain-based nutrition bars are convenient and healthy, they have become a very popular product.

One type of bar that has become popular in the recent years is commonly called an "energy bar" or "performance bar." These products are typically especially formulated for use by active individuals such as athletes, and include ingredients that are intended to boost athletic performance, endurance, etc. Such energy bars provide an easy way for athletes to consume foods that are especially formulated to improve performance.

Similarly, many individuals use amino acid supplements as dietary supplements or as directed by health professionals. Active individuals such as athletes often consume amino acid supplements, which typically are provided in the form of capsules or tablets, in order to obtain improved results in sporting events.

Although some energy bars are formulated to incorporate elevated levels of protein, there is an ongoing need for foods that are formulated to provide specialized nutritional requirements.

DETAILED DESCRIPTION OF PREFERRED EMBODIMENTS

The nutrition bar of the present invention is formulated to incorporate a blend of free form amino acids in amounts designed to provide specific nutritional benefits. In its most preferred embodiment the present invention is a combination of amino acids formulated into a fruit-based "energy bar" or "performance bar" that tastes good and thus provides a readily available source of amino acids in the form of a food product that is easy to consume. Although the nutrition bar of the present invention is formulated primarily for active users such as athletes, the benefits of the amino acids formulated into the bar will be of use to many other consumers as well.

The bar detailed herein incorporates a specifically blended combination of free form amino acids with other ingredients to formulate a bar. The combination of the amino acid blend with the fruits and grains and other components thus defines a good-tasting food-based delivery system for the amino acid blend. The presence of natural fruit sugars in the bar aids in the digestion and absorption of amino acids. Detailed formulations for the present invention are given below. Nonetheless, the invention is primarily embodied in a bar that is fruit-based and contains the amino acids (and other components) set forth in the blended combination below in table A. As detailed below, the fruit-based bar may include many other optional ingredients that provide many functional benefits and enhance aspects such as flavor, etc.

TABLE A

Amino Acid Blend

|   | Amino Acid Blend | Concentration Range (weight percent in blend) |
|---|---|---|
| A. | L-histidine HCL | 7-15 |
| B. | L-leucine | 7-15 |
| C. | L-phenylalanine | 7-15 |
| D. | L-lysine HCL | 7-15 |
| E. | L-arginine HCL | 7-15 |
| F. | L-valine | 7-15 |
| G. | L-isoleucine | 2-10 |
| H. | L-alanine | 2-10 |
| I. | L-glutamine | 2-10 |
| J. | Alpha ketoglutaric acid | 2-10 |
| K. | L-methionine | 2-10 |
| L. | L-threonine | 2-10 |
| M. | Pyridoxal 5-phosphate | 0-1 | blend of amino acids and other compounds set forth in Table A is prepared by blending the free form components in the proportions noted to form a dry blend that is referred to herein as the "amino acid blend." Because the amino acids are free form, they are quickly absorbed into the blood stream, especially in the performance bar formulated as described herein, which includes significant sources of fruit sugars, which aid in the absorption of the amino acids. Pyridoxal 5-phosphate is not an amino acid but instead is the active co-enzymatic form of vitamin B6. It is included in the amino acid blend because it is useful for the metabolism of the amino acids. It could eliminated from the amino acid blend described above and instead added into the nutrition bar formula described below as a separate ingredient. Moreover although it is a preferred component, it is optional and thus could be eliminated from the formulation of the bar altogether.

The foregoing amino acid blend is specially formulated to closely mimic the amino acids found in eggs because these specific amino acids and the relative percentages in which they are found in eggs are widely considered to be an ideal combination of amino acids.

A first preferred nutrition bar according to the present invention is prepared by combining the ingredients set forth below in Table B:

TABLE B

Nutrition Bar 1

|   | Ingredient | Concentration Range (weight percent in blend) [most preferred amount] |
|---|---|---|
| A. | fruit base blend | 92.50-97.50 [95.45] |
| B. | amino acid blend | 2.50-7.50 [4.55] |
| C. | binder | as needed |

The fruit base blend is preferably a combination of organic fruits including bananas, apricots, mango, raisins, prunes, apple, strawberry and other fruits, and organic grains including oats, and other optional ingredients, as set forth below, and may be for example a commercially available granola mix. Although oats are the primary grain used in the formulations described herein, other grains may be substituted for the oats with good results. Likewise, the percentage and types of fruits used in the fruit base blend may be varied widely. The binder is preferably a liquid carbohydrate sweetener such as a nutritive sweetener that is shelf stable and which binds the particles in the fruit base blend together. A preferred binder is commercially available from Advanced Ingredients, Inc. of Capitola, Calif. (www.advancedingredients.com) and is sold under the brand name EnergySmart™. The EnergySmart™ product is a viscous syrup that is shelf stable and contains fruit juice combined with natural grain dextrins.

The nutrition bar set forth in Table B is processed by first thoroughly blending the fruit base blend with the amino acid blend in a suitable blender. The binder is then added in an amount sufficient to bind the dry ingredients and the combination is blended to thoroughly mix the ingredients. The resulting mixture is then rolled out onto a suitable surface and is formed into a sheet having a desired thickness. The sheet is then cut into bars of the desired shape and the bars are packaged.

As noted in Table B, in the most preferred embodiment the amino acid blend is incorporated into the bar at a weight percentage (relative to the fruit blend) of 4.55%. The preferred net weight of the finished, packaged nutrition bar is about 66 g. At this weight the amount of the amino acid blend delivered to the consumer is within the range that is desirable for consumption as part of a supplemental dietary formulation. More specifically, with a 66 g nutrition bar that includes the amino acid blend at 4.55% by weight, the bar contains approximately 3.00 g of the amino acid blend set forth in Table A. Including the amino acid blend within the range noted in Table B has been found to produce a product that is good tasting, and the flavor from the amino acid blend does not adversely affect the flavor for most consumers.

A more detailed formulation for a nutrition bar according to the present invention is given in Table C, below: Table C: Nutrition Bar 2:

|   | Ingredient | Concentration Range (weight percent in blend) [most preferred amount] |
|---|---|---|
| A. | Rolled oats | 4.00-8.00 [6.26] |
| B. | cut oats | 2.00-4.00 [2.94] |
| D. | flax seed | 1.00-3.00 [1.47] |
| E. | sliced almonds | 12.00-17.00 [11.77] |
| F. | dried banana flakes | 5.00-7.00 [5.87] |
| G. | dried apricot | 9.00-14.00 [11.77] |
| H. | dried, sugared mango | 0.75-3.75 [2.21] |
| I. | raisins | 5.00-10.00 [7.35] |
| J. | dried prunes | 4.50-7.50 [7.35] |
| K. | dried cranberries | 4.25-7.00 [5.00] |
| L. | dried pineapple | 3.50-6.50 [4.41] |
| M. | dried apple | 6.50-11.25 [8.82] |
| N. | pumpkin seeds | 0.50-2.50 [1.47] |
| O. | dried apple flakes | 4.00-6.50 [5.15] |
| P. | dried strawberry flakes | 0.50-3.25 [1.47] |
| Q. | amino acid blend | 2.50-7.50 [4.55] |
| R. | chromium picolinate (11.70%) | 0.0001-0.0005 [0.0015] |
| S. | binder | 0.50-4.00 [2.94] |

*The granola blend may be any commercially available granola product having the ingredients desired in the particular formulation. One source of commercially available granola blends suitable for use in the formulations according to the present invention is GloryBee Foods, Inc. of Eugene, Oregon (www.glorybee.com). The ingredients labeled A through P comprise the fruit base blend. Of the ingredients in the fruit base blend, the fruit components comprise about 64 percent, the grain components about 20 percent, and the remaining components about 16 percent. These are preferred percentages for the fruit base blend but those of ordinary skill in the art will recognize that a performance bar as claimed herein may be made with different relative percentages of these ingredients.

Chromium picolinate is present in the formula as a source of chromium, which is know to work with insulin as cells take in glucose. Accordingly, the presence of chromium picolinate aids in the cellular uptake of the fruit sugars present in the bar.

The formulation set forth in Table C is specifically for a finished nutrition bar having a net weight of about 66 g. It will be appreciated that other than the three ingredients referenced in Table B, the specific components of the nutrition bar formula in Table C may be seen as optional, although they comprise a preferred combination of ingredients.

A nutrition bar according to the formulation of Table C is manufactured by combining all of the dry ingredients in a suitable blender (that is, everything in Table C except the binder) and thoroughly mixing the ingredients with sufficient agitation to insure uniform dispersion or all ingredients throughout the blend. The binder, which as noted above preferably is a liquid sweetener, is then added and the combination is blended so that all dry ingredients are coated with the liquid binder. The blend tends to warm somewhat during the mixing action; if necessary, the ingredients may be mixed in a blender fitted with a cooling system such as a jacketed tank. The blend is then spread or rolled onto a surface such as a flat table to form a sheet having a desired thickness, and the sheet is allowed to cool to room temperature. The sheet is then cut into bars having the desired shape and weight (preferably 66 g). The individual bars are then packaged as desired; typically, the bars are packaged in individual wrappers.

Each 66 g bar is formulated to contain 3.0 grams of the amino acid blend, which results in the following components (table D).

TABLE D amount of amino acid in 3.0 grams of amino acid blend

|   | Amino Acid | Amount in 3.0 g of blend (in mg) (per range set forth in Table A) |
|---|---|---|
| A. | L-histidine HCL | 0.21-0.45 |
| B. | L-leucine | 0.21-0.45 |
| C. | L-phenylalanine | 0.21-0.45 |
| D. | L-lysine HCL | 0.21-0.45 |
| E. | L-arginine HCL | 0.21-0.45 |
| F. | L-valine | 0.21-0.45 |
| G. | L-isoleucine | 0.06-0.3 |
| H. | L-alanine | 0.06-0.3 |
| I. | L-glutamine | 0.06-0.3 |
| J. | Alpha ketoglutaric acid | 0.06-0.3 |
| K. | L-methionine | 0.06-0.3 |
| L. | L-threonine | 0.06-0.3 |
| M. | Pyridoxal 5-phosphate | 0.00-0.03 |

Many consumers find amino acid supplements to be rather unpalatable and unpleasant tasting. Indeed, free form amino acids when added to foods can contribute flavors that are objectionable to many consumers, and which are relatively difficult to mask. This is at least one reason why free form amino acids such as those added to the formulations for nutrition bars as described herein are most typically consumed in the form of tablets and the like. Nonetheless, the formulations of the nutrition bar set forth herein in tables B and C have a pleasant flavor and the any flavor from the amino acids does not detract from the overall palatability of the bars.

The nutrition bars described herein define a preferred carrier system for oral delivery of amino acid supplements. The other components of the nutrition bars add significantly to the overall nutritional profile and provide a easily consumed food for active consumers such as athletes and the like. Included in the total carbohydrate analysis set forth below are significant amounts of natural fruit sugars, which are present in the bar from the fruit sources included therein. In addition to adding sweetness to the bar, the fruit sugars aid in the digestion and rapid uptake of the amino acids by the consumer.

A 66 g performance bar formulated according to the recipe set forth above has the following nutritional characteristics:

| | | |
|---|---|---|
| a. | calories: 240 | |
| b. | fat calories: 7 | |
| c. | total fat: 7 g (11%*) | |
| d. | saturated fat: 1 g (5%*) | |
| e. | cholesterol: 0 mg | |
| f. | sodium: 45 mg (2%*) | |
| g. | total carbohydrates: 34 g (13%*) | |
| h. | dietary fiber: 5 g (20%*) | |
| i. | sugars: 25 g | |
| j. | protein: 8 g | |
| k. | vitamin A: 8%* | |
| l. | vitamin C: 50%* | |
| m. | calcium: 5%* | |
| n. | iron: 2%* | |
| o. | vitamin B-6: 250%* | |
| p. | chromium: 250%* | |

*Percent daily values are based on a 2,000 calorie per day diet.

While the present invention has been described in terms of a preferred embodiment, it will be appreciated by one of ordinary skill that the spirit and scope of the invention is not limited to those embodiments, but extend to the various modifications and equivalents as defined in the appended claims.

The invention claimed is:

1. An edible bar, comprising:
   between about 92.50 to about 97.50 percent fruit base blend comprising at least dehydrated fruits, grain and nuts;
   between about 2.50 to about 7.50 percent free form amino acids in an amino acid blend, said amino acid blend consisting of 7 to 15 percent histidine, 7 to 15 percent leucine, 7 to 15 percent phenylalanine, 7 to 15 percent lysine, 7 to 15 percent arginine, 7 to 15 percent valine, 2 to 10 percent isoleucine, 2 to 10 percent alanine, 2 to 10 percent glutamine, 2 to 10 percent alpha ketoglutaric acid, 2 to 10 percent methionine and 2 to 10 percent threonine; and
   a binder in an amount sufficient to form the fruit base and amino acids into a bar.

2. The bar according to claim 1 wherein said amino acid blend is present in an amount between about 4.0 and 5.0 percent and the net weight of the bar is about 66 grams.

3. The bar according to claim 1 wherein said amino acid blend is present in an amount of about 4.55 percent.

4. The bar according to claim 1 wherein said amino acid blend further includes up to about 1 percent pyridoxal 5-phosphate.

5. The bar according to claim 1 wherein said binder comprises a liquid carbohydrate sweetener.

6. The bar according to claim 5 wherein a single serving includes about 25 g sugars, and wherein said sugars include fruit sugars.

7. The bar according to claim 1 including chromium picolinate.

8. The bar according to claim 1 wherein the fruit base blend comprises at least about 60 percent fruit and about 15 percent grain.

9. A nutrition bar comprising:
   between about 92.50 to about 97.50 percent fruit base blend comprising at least dehydrated fruit in an amount of at least about 60 percent of the blend, and grain in an amount of at least about 15 percent of the blend;
   between about 2.50 to about 7.50 percent free form amino acids in an amino acid blend, wherein said amino acid blend consists of histidine, leucine, phenylalanine, lysine, arginine, valine each present in an amount between 7 and 15 percent of said blend, and isoleucine, alanine, glutamine, alpha ketoglutaric acid, methionine and threonine each present in an amount between 2 and 10 percent of said blend; and
   a binder in an amount sufficient to form the fruit base blend and amino acid blend into a bar.

10. The nutrition bar according to claim 9 including between about 0.5 and 4 percent binder, and wherein the binder is a liquid carbohydrate sweetener.

11. The nutrition bar according to claim 10 packaged in a single serving size configured to deliver to a consumer at least about 25 g sugars.

12. The nutrition bar according to claim 9 including chromium picolinate.

13. The nutrition bar according to claim 12 including pyridoxal 5-phosphate.

* * * * *